United States Patent Office 3,402,191
Patented Sept. 17, 1968

3,402,191
N,N-DISUBSTITUTED AMINOALKYLSILOXANE COPOLYMERS AND AMINE OXIDE, QUATERNARY AMMONIUM SALT, AND COORDINATION COMPOUNDS OF TRANSITION METAL DERIVATIVES THEREOF
Edward L. Morehouse, Snyder, N.Y., assignor to Union Carbide Corporation, a corporation of New York
No Drawing. Filed Aug. 27, 1963, Ser. No. 304,965
13 Claims. (Cl. 260—448.2)

ABSTRACT OF THE DISCLOSURE

This invention relates to novel tertiary aminoorganosilicon compounds (silanes and siloxanes) which are characterized by the presence of at least one ether linkage in the organo group connecting the tertiary amino group to silicon. This invention further relates to novel derivatives of these amines (i.e., the amine oxide, salt and metal coordination compound derivatives of these amines). The salt derivatives include the reaction products of the amines with alkyl halides, dialkyl sulfates, chloroalkanoic acid esters and carboxylic acids. In the specific case where there are a plurality of ether linkages linking the nitrogen atom to silicon, the amines and their derivatives are a species of siloxaneoxyalkylene block copolymers. The various types of novel compounds claimed are useful as surfactants.

---

This invention relates to organosilicon compounds and, in particular, to tertiary amino-organosilicon compounds wherein the tertiary amino group is linked to silicon by a divalent hydrocarbon group containing an ether linkage. This invention further relates to derivatives of such tertiary amino-organosilicon compounds and, in particular, to amine oxides, salts and metal coordination compounds derived from such tertiary amino-organosilicon compounds.

This invention provides tertiary amino-organosilanes having the formula:

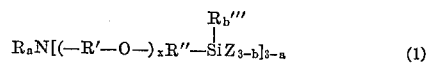

wherein R is a monovalent hydrocarbon group, a hydroxy terminated polyalkyleneoxy group, an alkenyloxy terminated polyalkyleneoxy group, a hydroxyalkyl group, a tertiary aminoalkyl group or a divalent group which, together with the nitrogen atom in the formula forms a heterocyclic ring, $a$ has a value of from 0 to 2 inclusive and represents the valence of the group or groups represented by R; $x$ has a value of at least 1; R' is an alkylene group; R'' is an alkylene group containing at least two successive carbon atoms, one of which is attached to the silicon atom of the formula and the other of which is attached to the adjacent ether oxygen atom in the formula; R''' is a monovalent hydrocarbon group free of aliphatic unsaturation, Z is a hydrocarbonoxy group and $b$ has a value of from 0 to 2 inclusive. When $a$ in Formula 1 is 0, no groups represented by R are present; when $a$ in Formula 1 has a value of 1, R is one of the above-identified monovalent groups (i.e. a monovalent hydrocarbon group, a hydroxy terminated polyalkyleneoxy group, an alkenyloxy terminated polyalkyleneoxy group, a hydroxyalkyl group or a tertiary aminoalkyl group); and when $a$ in Formula 1 has a value of 2, R can represent either two such monovalent groups or a divalent group which, together with a nitrogen atom in the formula, forms a heterocyclic ring.

Typical of the monovalent hydrocarbon groups represented by R in Formula 1 are the linear alkyl groups (for example the methyl, ethyl, propl, butyl and octadecyl groups), the cyclic alkyl groups (for example the cyclohexyl and cyclopentyl groups), the linear alkenyl groups (for exapmle the vinyl and the butenyl groups), the cyclic alkenyl groups (for example the cyclopentyl and the cyclohexenyl groups), the aryl groups (for example the phenyl and naphthyl groups), the alkaryl groups (for example the tolyl group) and the aralkyl group (for example the benzyl and beta-phenylethyl groups). Typical of the hydroxy terminated polyalkyleneoxy groups represented by R in Formula 1 are the hydroxy terminated polyethyleneoxy, polypropyleneoxy, poly(mixed ethyleneoxy-propyleneoxy) and polybutyleneoxy groups. These latter groups can be represented by the formula $HO(C_yH_{2y}O)_{x+1}$ wherein $y$ has a value of at least 2 and $x$ has a value of at least 1. Typical of the alkenyloxy terminated polyalkyleneoxy groups represented by R in Formula 1 are the vinyloxy or allyloxy terminated polyethyleneoxy, polypropyleneoxy, poly(mixed ethyleneoxy - propyleneoxy) and polybutyleneoxy groups. These latter groups can be represented by the formulae: $CH_2=CHO(C_yH_{2y}O)_{x+1}$ and $CH_2=CH_2CH_2O(C_yH_{2y}O)_{x+1}$ wherein $y$ and $x$ are as above defined. Typical of the hydroxyalkyl groups represented by R in Formula 1 are the beta-hydroxyethyl, gamma-hydroxypropyl, delta-hydroxybutyl, and epsilon-hydroxypentyl groups. Typical of the tertiary amino-alkyl groups represented by R in Formula 1 are the beta-N,N-dimethyl aminoethyl, gamma-N,N-diphenyl aminopropyl, delta-N,N-dibenzyl aminobutyl and epsilon-N,N-dihexyl aminopentyl groups. Typical of the heterocyclic rings formed by R and N in Formula 1 [when $a$ is 2 and R is a divalent group] are the heterocyclic rings present in piperazine, morpholine, pyrrole, imidazole (glyoxalin), indole, pyralole, thiazole, triazole, tetrazole and carbazole. Preferably such rings are composed of only carbon and nitrogen, with hydrogen as the only substituent on the ring or of only carbon, nitrogen and oxygen with hydrogen as the only substituent on the ring. Typical of the alkylene groups represented by R' and R'' in Formula 1 are the 1,2-ethylene; 1,3-propylene; 1,2-propylene; 1,4-n-butylene; isobutylene; and 1,5-pentlylene groups. Typical of the monovalent hydrocarbon groups free of aliphatic unsaturation represented by R''' in Formula 1 are the linear alkyl groups (for example the methyl, ethyl, propyl, butyl and octadecyl groups), the cyclic alkyl groups (for example the cyclohexyl and cyclopentyl groups), the aryl groups (for example the phenyl and naphthyl groups), the alkaryl groups (for example the tolyl group) and the aralkyl group (for example the benzyl and beta-phenylethyl groups). Typical of the hydrocarbonoxy groups represented by Z in Formula 1 are the alkoxy groups (e.g. the methoxyl, ethoxy, propoxy, and butoxy groups), and the aryloxy groups (e.g. the phenoxy and the tolyloxy groups).

This invention additionally provides amine oxides of the silanes represented by Formula 1. Such amine oxides are represented by the formula:

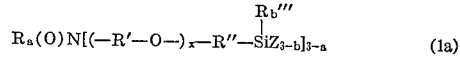

wherein R, R', R'', R''', Z, $x$, $a$ and $b$ have the above-defined meanings.

This invention also provides salts of the silanes represented by Formula 1. Such salts are represented by the formula:

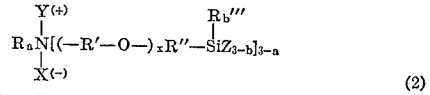

wherein R, R', R'', R''', Z, $x$, $a$ and $b$ have the above-defined meanings; X is a halogen atom, an acyloxy group, or a monovalent group represented by the formula

and Y is a hydrogen atom, a monovalent group represented by the formula $-C_zH_{2z}COOR'''$ where $z$ has a value from 1 to 20 and $R'''$ has the above-defined meanings or a monovalent hydrocarbon group containing from 0 to 1 halogen atoms, cyano groups, hydroxy groups, epoxy oxygen atoms and carbalkoxy groups as substituents. When X in Formula 2 is a $YSO_4$ group, Y is free of said substituent groups.

Typical of the halogen atoms represented by X in Formula 2 are the chlorine, bromine and iodine atoms. Typical of the groups represented by Y in Formula 2 are the groups defined above for R and the halogen, cyano, hydroxy, epoxy and carbalkoxy substituted derivatives thereof. Typical of those groups represented by X in Formula 2 which in turn have the formula $-YSO_4$ are the $-CH_3SO_4$ and $-C_2H_5SO_4$ groups. Typical of those groups represented by Y in Formula 2 which in turn are represented by the formula $-C_zH_{2z}COOR'''$ are the cations formed by removal of the halogen atoms from halo-alkanoic acid esters (e.g., $-CH_2COOCH_3$ and $-CH_2COOC_2H_5$). Typical of the acyloxy groups represented by X in Formula 2 are the anions produced by the hydrolysis of alkanoic acids (e.g. $CH_3COO-$ and $$CH_3CH_2COO-)$$

or aryl carboxylic acids (e.g. $C_6H_5COO-$ and $$CH_3C_6H_4COO-)$$

In addition, this invention provides tertiary aminoorganosiloxanes having the group represented by the formula:

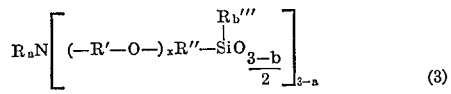     (3)

wherein R, R', R", R''', x, a and b have the above-defined meanings.

Moreover, this invention provides amine oxides derived from the tertiary amino siloxanes containing the group represented by formula 3. These amine oxides contain the group represented by the formula:

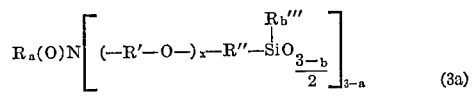     (3a)

wherein R, R', R", R''', x, a and b have the above defined meanings.

Further, this invention provides salts of the siloxanes containing the group represented by Formula 3. These salts contain the group represented by the formula:

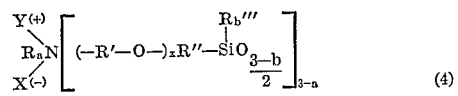     (4)

wherein R, R', R", R''', x, a, b, X and Y have the above-defined meanings.

The siloxanes of this invention include tertiary amines consisting essentially of only groups represented by Formula 3, amine oxides consisting essentially of only groups represented by Formula 3a, and salts consisting essentially of only groups represented by Formula 4. Also included among the siloxanes of this invention are tertiary amines consisting essentially of both groups represented by Formula 3 and additional groups such as those represented by Formulae 5 to 10 below. In like manner, the siloxanes of this invention also include amine oxides consisting essentially of both groups represented by Formula 3a and additional groups such as those represented by Formulae 5 to 10 below. Similarly, the siloxanes of this invention also include salts consisting essentially of both groups represented by Formula 4 and additional groups such as those represented by Formulae 5 to 10 below.

Thus the additional groups that can be present in the siloxanes of this invention include the hydrosiloxy and hydrocarbylsiloxy groups having the formula:

     (5)

wherein G is a hydrogen atom or a monovalent hydrocarbon group as defined for R above and $c$ has a value from 0 to 3 inclusive.

Other additional groups that can be present in the siloxanes of this invention are siloxane groups having an oxyalkylene moiety attached to silicon by a silicon to carbon bond. These latter siloxane groups are illustrated by the groups having the formulae:

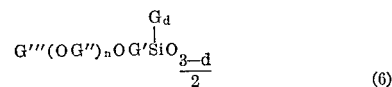     (6)

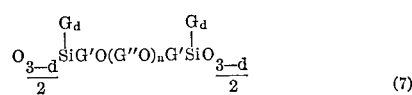     (7)

and

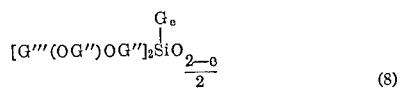     (8)

wherein G has the above-defined meaning, G' is an alkylene group containing at least two successive carbon atoms as defined above for R", G" is an alkylene radical containing at least two carbon atoms as defined above for R", G''' is a hydrogen atom or a monovalent hydrocarbon group as defined for R above, $n$ has a value of at least one; $d$ has a value from 0 to 2 inclusive and $e$ has a value from 0 to 1 inclusive.

Still other additional groups that can be present in the siloxanes of this invention are siloxane groups having silicon-bonded hydroxyl- or acyloxy-substituted organo radicals. These latter siloxane groups are illustrated by groups having the formulae:

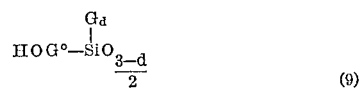     (9)

wherein G and $d$ have the above-defined meanings and G° is a divalent hydrocarbon group (e.g. an alkylene group containing at least three successive carbon atoms such as a 1,3-propylene group or a 1,4-butylene group or an arylene group such as a phenylene group); and

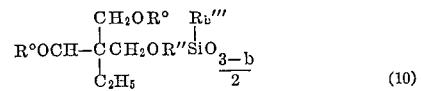     (10)

wherein R", R''' and $b$ have the above-defined meanings, and R° is a hydrogen atom or an acyl group (i.e. a group represented by the formula RCO— where R has the above-defined meaning); Typical of these acyl groups are the acetyl, $CH_3CH_2COO-$, $CH_2=CHCO-$, stearoyl $(CH_3(CH_2)_{16}CO-)$ and the like.

When groups such as those represented by Formula 5 to 10 are present, it is preferred that the siloxanes of this invention contain from 1 to 99 mole percent of such groups (most preferably from 10 to 90 mole percent of such groups) and from 1 to 99 mole percent of groups represented by Formula 3, 3a or 4 (most preferably from 10 to 90 mole percent of such groups).

Terpolymeric siloxanes of this invention are illustrated by those containing from 1 to 98 mole percent (preferably from 10 to 80 mole percent) of groups represented by Formulae 3, 3a or 4, from 1 to 98 mole percent (preferably from 10 to 80 mole percent) of groups represented by Formula 5 and from 1 to 98 mole percent (preferably from 10 to 80 mole percent) of groups represented by Formula 6, 7, 8, 9, or 10.

As is apparent from illustrative Formulae 5 to 10, the siloxanes of this invention can contain any of a variety of siloxane groups in addition to the essential siloxane groups represented by Formulae 3, 3a and 4. Such additional groups are not limited to the illustrative groups represented by Formula 5 to 10, and include the various other known organo-functional siloxane groups.

Moreover, this invention provides metal coordination compounds of the above-described tertiary amines of this invention. These coordination compounds are more fully described hereinafter.

Preferred siloxanes of this invention have the average formulae:

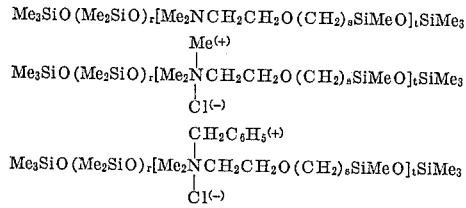

wherein $r$ has a value from 0 to 24 inclusive, $s$ has a value from 2 to 3 inclusive and $t$ has a value from 1 to 5 inclusive.

The tertiary amines of this invention can be produced by the platinum-catalyzed addition reaction of an alkenyl ether of a tertiary hydroxyalkyl-amine and a hydrosilicon compound (i.e. a silane or siloxane containing silicon-bonded hydrogen). This reaction can be illustrated by the skeletal equation:

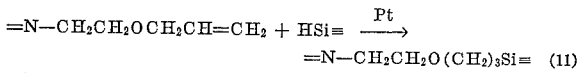

The platinum employed as a catalyst in this addition reaction can be in the form of a platinum compound (such as chloroplatinic acid) or in the form of elemental platinum supported, if desired, on a material such as charcoal or the gamma allatrope of alumina. The chloroplatinic acid can be used dissolved in tetrahydrofuran, ethanol, butanol, or ethylene glycol dimethyl ether. In general, from 5 to 50 parts by weight of platinum per million parts by weight of the reactants is preferred as the catalyst. The catalyst is preferably present in one reactant and the other reactant is added thereto incrementally. In this addition reaction, temperatures from 100° C. to 160° C. are preferred and solvents for the reactants (e.g. alcohols such as ethanol, aromatic hydrocarbons, such as toluene and ethers such as ethylene glycol dimethyl ether) can be employed, particularly where the reactants are incompatible and/or it is desired to minimize cross-linking. The relative amounts of the reactants employed is not critical and, when an excess of SiH groups are present in a hydrosiloxane reactant, the product will have residual SiH groups which can be used as reactive sites. The addition reaction is preferably conducted under an atmosphere of an inert gas to minimize side reactions and the product can be purified by conventional methods (e.g. distillation, sparging and/or filtration) if desired.

In carrying out the addition process to prepare the tertiary amines of this invention of the siloxane variety, it is preferred to add the amine to the hydrosiloxane. Under these conditions the catalyst is in a particularly active state. Furthermore, when the hydrosiloxane is less volatile than the amine, this order of addition permits higher reaction temperatures which can lead to shorter reaction times. Useful products can also be obtained when the reverse order of addition is used. When the olefinic reactants have functional organic groups which may react with silanic hydrogen, and it is desirable to minimize such side reactions, and, in such cases, it is preferable to follow the latter order of addition whereby the silanic hydrogen-containing silicone is added to olefinic amine. An example of such functionality is an alcohol group. In some additions all of both the hydrosiloxane and olefinic alkanolamine may be combined, catalyst added and mixture heated to obtain addition. Because of the exothermic nature of these additions, however, this method of combining the reactants is not recommended.

When a monoalkenyloxyalkylamine is used in the addition process, in order to assure complete reaction of all silanic hydrogen it is preferred that olefin and SiH be combined in stoichiometric amounts or up to a sixty percent excess of olefin. The excess olefin required is somewhat dependent upon the particular hydrosiloxane used. Presence of SiH in the reaction mixture is detected readily by an external semi-quantitative test using an ethanol-water solution of silver nitrite. Where the silicon has more than one silanic hydrogen per silicone chain and the amine contains two or more olefinic groups, a large excess of one reactant or the other is necessary when it is desired to minimize cross-linking which may produce gels or fluids of undesirably high viscosities.

The hydrosilicon compound employed in producing the tertiary amines of this invention by the above-described addition process include hydrosilanes (e.g. methylhydrogendiethoxysilane and phenylhydrogendimethoxysilane) and hydrosiloxanes. The latter siloxanes contain groups represented by Formula 5 wherein at least some of the groups represented by G are hydrogen atoms and these siloxanes can also contain additional groups such as those represented by Formulae 6 to 10, when it is desired that the product contain such groups. Groups represented by Formulae 6 to 10 can also be incorporated into the siloxanes of this invention by equilibrating siloxanes of this invention with other siloxanes composed of such groups. Alternatively such groups can be incorporated into the siloxanes of this invention by employing both an alkenyl ether of a hydroxyalkylamine and an alkenyl ether of an appropriate organofunctional organic compound as reactants with a hydrosilicon compound in the above-described addition process. Such alkenyl ethers of organofunctional organic compounds include the alkenyl ethers of polyalkylene oxides (when it is desired to produce siloxanes of this invention containing the additional groups represented by Formula 6, 7 or 8) and the alkenyl ethers of trimethylol propane and the alkenyl ethers of the mono- or di-monocarboxylic acid esters of trimethylol propane (when it is desired to produce siloxanes of this invention containing the additional group represented by Formula 10).

The alkenyl ethers of tertiary hydroxyalkylamines employed in producing the tertiary amines of this invention by the above-described addition process include mono-allyl or monovinyl ethers of the following amines: N,N-diethyl ethanolamine, N,N-dimethyl ethanolamine, N,N-diisopropyl ethanolamine, N,N-dimethyl propanolamine, N,N-dihexylethanolamine, N,N-dilauryl propanolamine, N-methyl, N-octadecylethanolamine, triethanolamine, N-ethyl diethanolamine, N-methyl diethanolamine, N,N,N', N'-tetrakis(2-hydroxypropyl)ethylenediamine, 3-dimethyl-aminopropyl diethanolamine, 1-hydroxyethyl-2-heptadecyl imidazoline, N-hydroxyethyl morpholine, N-hydroxyethyl-N-methyl piperazine; diallylated N-methyl diethanolamine and diallylated triethanolamine; and triallylated triethanolamine and tetraallylated N,N,N',N'-tetrakis(2-hydroxyethyl)ethylenediamine. Other suitable alkenyl ether reactants are the alkenyl ethers of the alkylene oxide adducts of tertiary hydroxyalkyl-amines. Typical of such ethers are

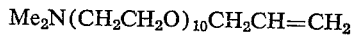

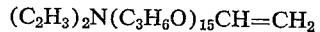

and

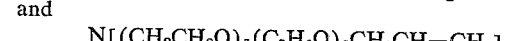

These latter alkenyl ethers can be produced by reacting a tertiary hydroxyalkyl amine and an alkylene oxide in the presence of a basic catalyst to produce a tertiary hydroxy-terminated polyalkyleneoxy amine, converting the hydroxy terminating group to an alkali metal oxy group (e.g. —ONa) and reacting the latter group with a haloalkene (e.g. allyl chloride) to produce the alkenyl ether.

The amine oxides of this invention are readily produced by oxidizing the tertiary amines of this invention. The preparation of these amine oxides is described more fully in Example XIV below.

The salts of this invention can be produced by the reaction of the tertiary amines of this invention with hydrocarbyl halides, dihydrocarbyl sulfates, hydrogen halides, monocarbylic acids and the hydrocarbyl esters of haloalkanoic acids. Conventional procedures can be used in producing the salts of this invention.

Particularly ractive tertiary amines of this invention for conversion to salts are those in which two methyl groups are substituents on the nitrogen. When two ethyl groups are on the nitrogen, for example, salt formation rates are much less. A particularly active salt forming agents such as benzyl chloride, or various bromides or iodides may be needed particularly in forming guaternary salts. Typical hydrocarbyl halides which may be used in producing the salts of this invention are the following: methyl chloride, ethyl chloride, 2-chloride, 2-chloropropane, 1-chlorobutane, 1-chloro-3-methylbutane, 1-chloroheptane, 1-bromoheptane, 3-(chloromethyl)heptane, 1-chlorodecane, 1 - chlorododecane, 1 - chlorooctadecane, benzyl chloride, 2-chloro ethylbenzene, chlorocyclohexane, 2-chloroethanol, chlorhydrin, epichlorhydrin, 3-chloropropene and 3-chloro-2-methylpropene. The corresponding bromides or iodides may also be used. The hydrocarbyl halide may contain functional groups other than halogen provided they do not also react with the tertiary amino group, e.g. hydroxyl, carboalkoxy or cyano. Hydrocarbyl halides in which the halogen is linked to a carbon of an aromatic ring may be used, but their use is less desirable of the typical sluggishness of the reactions of halogen of this type with tertiary amines. Iodo compounds of this type are the most reactive. In addition to hydrocarbyl halides, various dihydrocarbyl sulfate esters are useful in forming salts, for example, dimethyl or diethyl sulfate.

Other useful salt forming compounds are hydrogen chloride, hydrogen bromide, acetic acid, propionic acid, acrylic acid, benzoic acid, and the methyl ethyl and phenyl esters of chloroacetic acid and chloropropionic acid.

The salt forming reactions do not require a special catalyst. Advantageous, however, are polar solvents that dissolve both the starting reaction mixture and the desired salt. In this respect alcohols, particularly methanol, ethanol and isopropanol are often particularly useful. The concentration of the solvents is not narrowly critical. A preferred concentration of alcohol, e.g. ethanol, however, is about 20 to 50 weight percent based on the reactants. At this level, alcohol solvent many of the salts of this invention are soluble. Larger or smaller solvent/reactant ratios may be used however. Other useful polar solvents include dimethylformamide, dimethylacetamide, and various nitriles. Less polar solvents may be used, such as ethylene glycol dimethyl ether, isopropyl ether, toluene, benzene or n-hexane, but these may have the disadvantage that the salt produced precipitates from the solvent, sometimes as gummy solids difficult to process. Also, reactions in relatively non-polar solvents.

Salt formation may be run at pressures equal to or above atmospheric pressures. For small scale preparations it is often convenient to mix the tertiary amine, salt forming compound (e.g. an organohalide or organosulfate) and solvent and maintain at reaction temperatures until salt formation is essentially complete. When a low boiling salt forming compound (such as methyl chloride) is used, a convenient procedure is to heat tertiary amine and solvent to a temperature at which rapid reaction will occur, then add the salt forming compound in gaseous or liquid form to the reaction mixture. The temperatures for relatively rapid salt formations are variable and dependent upon the anture of the particular reactants. The order of reactivity of salt forming compounds with tertiary amines of this invention follows essentially the pattern of salt forming compounds with tertiary organic amines. When methyl chloride is used for salt formation and two methyl groups are substituents on the nitrogen of the tertiary aminosilicon, reactions are conveniently run in ethanol solvent in the temperature range 50–80° C. Lower temperatures may be used but reaction rates usually are impractically slow, particularly at atmospheric pressure. Higher temperatures may be used up to about 125° C., particularly in a closed vessel, but the absolute maximum is dependent upon the particular structure involved because of the different temperatures of dissociation of the salts. The salts of this invention are conveniently handled and used directly as solutions in the solvents in which the salts are produced.

The metal-amine coordination compounds of this invention can be produced by the reaction of a tertiary amine of this invention and the transition metal halides, hydroxides, nitrates, carboxylic acid salts, sulfates or phosphates. Typical of such transition metal compounds are ferric chloride, cobalt chloride, cupric chloride as well as the chlorides of zirconium, columbium, titanium and chromium. These coordination compounds are readily prepared by simply mixing the transition metal compound or its hydrate dissolved in a solvent such as ethanol with a tertiary amine of this invention at about room temperature. Preferably sufficient amine is used to provide at least two moles of nitrogen per mole of the transition metal.

The tertiary amines of this invention are useful as corrosion inhibitors for metals, such as iron, which come in contact with aqueous liquids, such as aqueous ethylene glycol.

The salts of this invention are useful as emulsifying agents for water-dimethylsiloxane oil mixtures and for water-paraffin oil mixtures. These salts are also useful for increasing the dispersibility of inorganic fillers and pigments (e.g. finely divided silica) in liquids such as latex paints. Those salts that are waxes are useful as the wax components in polishes for metal surfaces.

The coordination compounds of this invention are useful as emulsifying agents for water-oil mixtures used in cosmetics and as mold release agents.

The tertiary amines, amine oxides, salts and coordination compounds of this invention are useful as sizes for organic textile fibers and glass fibers in order to soften and lubricate the fibers and increase their water repellancy. Those compounds of this invention which are gums are useful in producing elastomers and those compounds of this invention that are resins are useful as protective coatings for metals such as iron.

In the various uses enumerated above for the compounds of this invention, conventional procedures of application (e.g. conventional emulsifying, coating and sizing procedures) can be used to good advantage.

The following examples illustrate the present invention:

EXAMPLE I

To a one liter flask equipped with thermometer, stirrer, dropping funnel and nitrogen atmosphere was added a hydrosiloxane of the average formula:

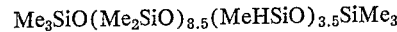

(258 g., 0.97 mole SiH). The hydrosiloxane was heated to 150° C. and 50 parts of platinum per million parts by weight of the reactants were added as chloroplatinic acid. The allyl ether of N,N-dimethylethanolamine (142 grams, 1.1 mole), having the formula

was added dropwise while maintaining the reaction mixture so formed at 150–158° C. Total time of addition was eight minutes. Stirring was continued at 150° C. After one half hour from the start of addition, analysis for silanic hydrogen indicated a conversion of SiH to gamma - (2-dimethylamino-ethoxy)propyl groups of at least 80%. The reaction mixture was heated at 150° C. for about three hours longer, then sparged at this temperature for 40 minutes with nitrogen at a rate of three liters per minute. The adduct (329 grams) was an amber oil with a viscosity at 25° C. of 90 centistokes. It was insoluble in water. The adduct was a siloxane of this invention having the average formula:

Me₃SiO(Me₂SiO)₈.₅[Me₂NCH₂CH₂O(CH₂)₃SiMeO]₃.₅SiMe₃

The tertiary amine produced as described above was converted to a quaternary ammonium salt as follows. The amine (164 grams, 0.36 moles N) was mixed with 200 grams of absolute ethanol solvent in a one liter flask equipped with magnetic stirrer, Dry Ice-acetone condenser, thermometer and gas dispersion tube. The solution was heated to gentle reflux, then gaseous methyl chloride (36 grams, 0.71 mole) added through the dispersion tube at a rate such that the temperature of the reactants did not drop below 50° C. The addition took about two hours. After overnight standing the reaction product was sparged to 70° C. The product (250 grams) was a solution of quaternary ammonium salt of this invention (70 weight percent). The viscosity at 25° C. was 118 centistokes. The aqueous surface tension at one percent concentration of the salt was 30.2 dynes per centimeter at 25° C. The salt had the average formula:

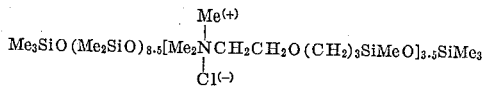

EXAMPLE II

A hydrosiloxane of the average composition

Me₃SiO(MeHSiO)₁.₅SiMe₃

(1.02 moles SiH) was weighed into a flask equipped with stirrer, dropping funnel, thermometer and condenser. The hydrosiloxane was heated to reflux (125° C.) and 20 parts by weight of platinum per million parts by weight of the reactants were added as chloroplatinic acid. The allyl ether of N,N - dimethylethanolamine (161 grams, 1.25 moles) was added dropwise at reflux (120–125° C.) over a period of 40 minutes. The reaction mixture was heated until its temperature was 150° C., the materials so volatilized were condensed and then added dropwise to the reaction mixture at 130–160° C. The reaction mixture was maintained at 125–145° C. for four more hours, then sparged to 130° C. with nitrogen at a rate of six liters per minute. The product was a clear yellow oil (257 grams) which was a siloxane of this invention having the average formula:

Me₃SiO[Me₂NCH₂CH₂O(CH₂)₃SiMeO]₁.₅SiMe₃

The tertiary amine produced as described above (200 grams, 0.64 mole N) was dissolved in 86 grams of ethanol of a flask equipped with stirrer, Dry Ice condenser, thermometer and gas dispersion tube. The solution was heated to reflux (83° C.), then gaseous methyl chloride (40 grams, 0.8 mole) passed into it over a period of 70 minutes. By the end of the addition, the temperature had dropped to 40° C. The reaction mixture was maintained at reflux for several hours, during which time the temperature gradually rose to 80° C. Then the mixture was sparged for five minutes with nitrogen at a rate of three liters per minute to remove volatile materials, and finally filtered. The product (297 grams) was a clear solution of quaternary ammonium salt of this invention dissolved in ethanol (78 weight-percent salt). The aqueous surface tension of this salt at a concentration of one weight percent at 25° C. was 22.5 dynes per centimeter. The salt had the average formula:

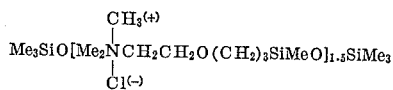

EXAMPLE III

A mixture of hydrosiloxane of average composition

Me₂SiO(Me₂SiO)₂₁(MeHSiO)₃.₅SiMe₃

(110 grams, 0.210 mole SiHO), 150 cubic centimeters of toluene and 300 parts by weight of platinum per million parts by weight of the reactants (as chloroplatinic acid), were heated to reflux in a 500 cubic centimeter flask equipped with stirrer, condenser, dropping funnel, thermometer and nitrogen atmosphere. The allyl ether of N,N-dimethylethanolamine (42 grams, 0.33 mole) was added dropwise to the hydrosiloxane over a period of one-half hour. The reaction mixture so produced was maintained at reflux for three hours longer, filtered and sparged at 150° C. for one hour with nitrogen at a rate of one and one-half liters per minute. The product was a dark yellow oil which was a siloxane of this invention having the average formula:

Me₃SiO(Me₂SiO)₂₁[Me₂NCH₂CH₂O(CH₂)₃SiMeO]₃.₅SiMe₃

The tertiary amine produced as described above (50 grams, 0.052 mole N) was mixed with 75 cubic centimeters of ethanol in a 250 cubic centimeter flask equipped with Dry Ice condenser, magnetic stirrer, thermometer and gas dispersion tube. The solution was heated to reflux and gaseous methyl chloride (10 grams, 0.2 mole) was added through the dispersion tube at a rate such that the temperature of the reactants did not drop below 50° C. Addition of the methyl chloride was conducted over a period of two hours. The reaction mixture was maintained at 50° C. for two more hours, and then stripped at reduced pressure to a temperature of 50° C. The product was a very viscous, amber oil which was soluble in a solution composed of 85 volume-percent water and 15 volume-percent ethanol. It was a profoamer for water and a one weight percent concentration of the product in water had a surface tension at 25° C. was 38 dynes per centimeter. The solution contained a quaternary ammonium salt of this invention having the average formula:

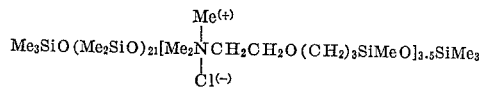

EXAMPLE IV

In a 500 cc. flask equipped with stirrer, dropping funnel, thermometer, condenser and nitrogen atmosphere, a hydrosiloxane having the average formula:

Me₃SiO(Me₂SiO)₈.₅(MeHSiO)₃.₅SiMe₃

(109 grams, 0.41 mole SiH) was heated to 150° C. and 50 parts by weight of platinum per million parts by weight of the reactants were added as chloroplatinic acid. The vinyl ether of N,N-diethylethanolamine (76 grams, 0.54 mole), having the formula:

(C₂H₅)₂NCH₂CH₂OCH=CH₂ was added to the hydrosiloxane at 150–160° C. over a period of twenty minutes. The reaction mixture was maintained at temperature for 1½ hours, then sparged for 40 minutes at 150° C. with nitrogen at three liters per minute. The product was a yellow liquid with a viscosity at 25° C. of 63 centistokes and was insoluble in water.

The product was a siloxane of this invention having the average formula:

Me$_3$SiO(Me$_2$SiO)$_{8.5}$[Et$_2$NCH$_2$CH$_2$OCH$_2$CH$_2$SiMeO]$_{3.5}$SiMe$_3$

The tertiary amine produced as described above (58 grams, 0.13 mole N) and benzyl chloride (17.1 grams, 0.135 mole) and 75 grams of ethanol were mixed in a 500 cubic centimeter flask equipped with stirrer, condenser, thermometer and nitrogen atmosphere. The reaction mixture was maintained at reflux for eight hours then sparged to a temperature of 73° C. with nitrogen. The product was a quaternary ammonium salt of this invention dissolved in ethanol, (88 weight-percent salt). The salt was soluble in water, and a one weight percent concentration of the salt in water gave a solution that had a surface tension at 25° C. of 27.8 dynes per centimeter. This salt had the average formula:

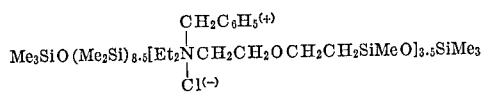

EXAMPLE V

A mixture of the tertiary amine of this invention produced as described in Example I (58 grams, 0.12 mole N), benzyl chloride (17 grams, 0.13 mole) and 75 grams of ethanol were heated to reflux in a 500 cubic centimeter flask equipped with stirrer, condenser, thermometer and nitrogen atmosphere. After one and one-half hours at reflux temperature, the reaction mixture was sparged for one-half hour at 65° C. using nitrogen at a rate of three liters per minute. The product (94 grams) so produced was a solution of a quaternary ammonium salt of this invention (79 weight-percent salt). The solution was soluble in water and the surface tension of the aqueous solution at 25° C. (one weight-percent concentration of the salt) was 28.9 dynes per centimeter. The salt had the average formula:

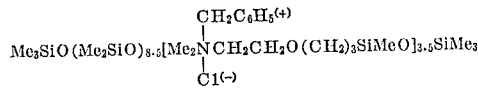

EXAMPLE VI

A hydrosiloxane having the average formula:

Me$_3$SiO(Me$_2$SiO)$_{6.8}$(MeHSiO)$_{5.6}$SiMe$_3$ (65.6 grams, 0.37 mole SiH) and 150 cubic centimeters of toluene were placed in a 500 cubic centimeter flask equipped with condenser, dropping funnel, stirrer and thermometer. The solution was heated to reflux and 100 parts by weight of platinum per million parts by weight of the reactants was added as chloroplatinic acid. The allyl ether of N,N-dimethylethanolamine (25.4 grams, 0.20 mole) was added dropwise over a period of ten minutes, and then the reaction mixture was maintained at reflux for one hour longer. Ofter this period benzothiazole (0.25 grams) was added to poison the platinum catalyst. The reaction mixture was sparged at 150° C. with nitrogen at a rate of three liters per minute and filtered. Seventy-three grams of a clear yellow oil was obtained which had viscosity of 32 centistokes. The oil was a siloxane of this invention having the average formula:

Me$_3$SiO(Me$_2$SiO)$_{6.8}$(MeSiHO)$_{3.6}$
　　　　　　　[Me$_2$NCH$_2$CH$_2$O(CH$_2$)$_3$SiMeO]$_2$SiMe$_3$

The tertiary amine produced as described above (50 grams, 0.081 mole N) was placed in a 500 cubic centimeter flask equipped with magnetic stirrer, thermometer, gas dispersion tube and Dry Ice condenser and dissolved in 80 cubic centimeters of ethylene glycol dimethyl ether. Gaseous methyl chloride (8.5 grams, 0.17 mole) was passed into the solution at 60–85° C. for a period of one hour. Because as reaction proceeded a solid quaternary ammonium salt of this invention precipitated, 60 cubic centimeters of tetrahydrofuran was added and the resulting solution maintained at 60–65° C. for one hour longer. The product was a solution containing 31 weight percent of the salt. The solution dissolved in water with some residual haze, but was completely soluble in water containing a small amount of ethanol. The salt so produced had the average formula:

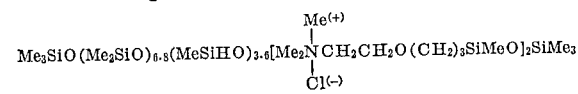

EXAMPLE VII

To a 500 cubic centimeter flask equipped with stirrer, dropping funnel, thermometer and nitrogen atmosphere was added a hydrosiloxane having the average formula:

Me$_3$SiO(Me$_2$SiO)$_{8.5}$(MeHSiO)$_{3.5}$SiMe$_3$ (66 grams, 0.25 mole of SiH).

The fluid was heated to 150° C. and 20 parts by weight of the platinum per million parts by weight of the reactants was added as chloroplatinic acid. The distearate of trimethylolpropane monoallyl ether (113 grams, 0.16 mole) was melted and blended with the allyl ether of N,N-dimethylethanolamine. (20.7 grams, 0.16 mole). The blend was added dropwise to the hydrosiloxane at 150° C. over a period of 30 minutes and the reaction mixture maintained at this temperature for a total of two hours. The product at 25° C. was a pale yellow wax leaving the average formula:

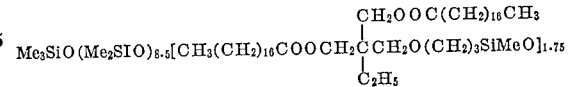

[Me$_2$NCH$_2$CH$_2$O(CH$_2$)$_3$SiMeO]$_{1.75}$SiMe

The above wax (170 grams, 0.11 mole N) was dissolved in 170 grams of ethanol in a 500 cubic centimeter flask equipped with magnetic stirrer, thermometer, Dry Ice condenser and gas dispersion tube. Gaseous methyl chloride (13.9 grams, 0.27 mole), was passed into the clear solution at 50–80° C. over a period of one and one-half hours. Temperature was maintained at 50–60° C. for three more hours. The reaction mixture was sparged at 90–100° C. for one hour with nitrogen at a rate of three liters per minute. The product (162 grams) was a wax melting at 31–32° C. and having the formula:

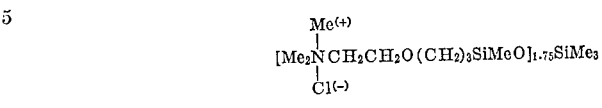

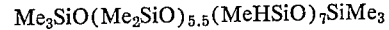

EXAMPLE VIII

To a 500 cubic centimeter flask equipped with stirrer, dropping funnel, thermometer and condenser was added a hydrosiloxane having the average formula:

Me$_3$SiO(Me$_2$SiO)$_{5.5}$(MeHSiO)$_7$SiMe$_3$ (70 grams, 0.53 mole SiH). Xylene solvent (86 grams) was added and the solution heated to reflux (139° C.). Chloroplatinic acid (containing 20 parts by weight of platinum per million parts by weight of the reactants) was added, then a mixture of an allyl ether of an ethylene oxide polymer having the formula:

Me(OCH$_2$CH$_2$)$_7$OCH$_2$CH=CH$_2$ (94 grams, 0.30 mole of the allyl group) and the allyl ether of N,N-dimethylethanolamine (39 grams, 0.30 mole of allyl groups) was added dropwise over a period of 35 minutes. The temperature of the reaction mixture at reflux was 150° C. The mixture was maintained at this temperature for three hours, then sparged at 130° C. for 45 minutes with nitrogen at a rate of three liters per minute. The product (184 grams) was a pale yellow liquid with a viscosity at 25° C. of 294 centistokes and a cloud point of 51° C. The product was a tertiary amine of this invention having the average formula:

Me$_3$SiO(Me$_2$SiO)$_{5.5}$[Me(OC$_2$H$_4$)$_7$O(CH$_2$)$_3$
SiMeO]$_{3.5}$[Me$_2$NC$_2$H$_4$O(CH$_2$)$_3$SiMeO]$_{3.5}$SiMe$_3$

The tertiary amine produced as described above (150 grams, 0.16 mole N) was dissolved in 64 grams of absolute ethanol in a 500 cubic centimeter flask equipped with stirrer, Dry Ice condenser, thermometer and gas dispersion tube. The solution was heated to reflux and gaseous methyl chloride (10 grams, 0.2 mole) added over a period of one half hour. At the end of the addition the temperature had dropped to 65° C. The reaction mixture was maintained at 65–80° C. for two hours, sparged for five minutes with nitrogen, then filtered. The product was a clear solution containing 78 weight percent of a quaternary ammonium salt of this invention which had no cloud point up to 100° C. The salt had the average formula:

Me$_3$SiO(Me$_2$SiO)$_{5.5}$[Me(OC$_2$H$_4$)$_7$O(CH$_2$)$_3$ $$\text{SiMeO}]_{3.5}[\text{Me}_2\overset{\text{Me}^{(+)}}{\underset{\text{Cl}^{(-)}}{\text{N}}}\text{C}_2\text{H}_4\text{O}(\text{CH}_2)_3\text{SiMeO}]_{3.5}\text{SiMe}_3$$

EXAMPLE IX

The quaternary ammonium salt produced as described in Example I was used as an emulsifier for a mixture of water and silicone oil. Three grams of the salt was blended with three grams of distilled water in a beaker using a shielded, three-bladed propeller. With continued stirring thirty grams of 350 centistokes silicone oil having the formula Me$_3$O(Me$_2$SiO)$_x$SiMe$_3$ was added slowly at a steady rate to the water-salt mixture. To the resultant grease was added sixty-four grams of water, slowly initially to the point of inversion, then more rapidly, and finally the diluted material was filtered. The product was a silicone oil-in-water emulsion. By the same techniques, and using the same weight ratios of ingredients, heavy paraffin oil was emulsified in water using the same salt as the emulsifier.

EXAMPLE X

The quaternary ammonium salt produced as described in Example I greatly modified the properties of aqueous suspensions of various inorganic powders as shown below. To a slurry containing 50 weight percent of particulate aluminum silicate pigment (4.8 micron average particle size) and 50 weight percent water was added various amounts of the salt of Example I. The control, i.e. no salt, was a thick, somewhat thixotropic slurry. Addition of 0.5 weight percent of the salt formed a paste; 1.0 weight percent gave a slurry slightly thinner than the control; 4.5 weight percent gave a very thin slurry from which the aluminum silicate settled, upon standing several hours, to a thick sludge and a large amount of supernatant liquid. Relative results obtained on a Brookfield viscometer illustrate the effects described below:

| Weight percent salt | Viscosity (cps.) |
|---|---|
| 0 | 3500 |
| 0.5 | Paste |
| 1.0 | 1200 |
| 4.5 | 50 |

In a second experiment small increments of the salt were added to thick slurries of various inorganic fillers, and concentrations determined for effecting gross changes in rheological properties. A thick slurry of calcium silicate (Wollastonite) and water, at weight-ratio 40/60, respectively, was deflocculated by 1.5 weight percent of the salt of Example I with formation of a very thin slurry. To a similar extent an aqueous slurry of Gamco carbonate at 40 weight percent solids was deflocculated by 0.5 weight percent concentration of the salt. An aqueous slurry of finely divided silica at 22 weight percent solids was converted to a thixotropic paste by 0.5 weight percent of the salt.

EXAMPLE XI

A formulation containing the quaternary ammonium salt produced as described in Example VII was a good polish on black enameled panels. One formulation was a clear solution consisting of 2.5 parts (by weight) quaternary silicone wax, 1.5 parts 350 centistokes dimethylsilicone oil having the formula: Me$_3$SiO(Me$_2$SiO)$_x$SiMe$_3$ and 96 parts mineral spirits. For each application to a panel a formulation was wiped on, and when dry wiped further with a clean soft cloth. Gloss, smearing tendencies and depth of color were determined visually. The above formulation gave a polish of good quality.

The shalt of Example VII wax also proved to be a satisfactory substitute for dimethysiloxane oil (a conventional additive for improving rub out and gloss in polishes). For example, a formulation consisting of 1.5 parts of the salt, 2.5 parts of a carnauba-type wax, and 96 parts mineral spirits give a polish equivalent to the polish attained with a formulation consisting of 1.5 parts of dimethylsiloxane oil having the formula: Me$_3$SiO(Me$_2$SiO)$_x$SiMe$_3$ and having a viscosity of 350 centistokes, 2.5 parts of the wax, and 96 parts mineral spirits.

One practical advantage of the salt of Example VII over organic waxes such as Carnauba is its high solubility in mineral spirits. Whereas formulations containing organic waxes are often two phases because of precipitation of theorganic waxes, those formulations based on the salt of Example VII remained clear.

EXAMPLE XII

A tertiary amine of this invention of Example I formed stable coordination compounds with transition metals as described below. Separate solutions of FeCl$_3$.6H$_2$O, CoCl$_2$.6H$_2$O or CuCl$_2$.2H$_2$O in ethanol were prepared containing about 0.3 weight percent concentrations of the metal salts. To 5 cubic centimeters of each of these solutions in a test tube was added several drops of the tertiary amine of Example I. With FeCl$_3$ an intensely orange, ethanol-soluble coordination compound was formed. This complex remained soluble when the ethanolic solution was diluted to a volume ratio of water to ethanol of 20/1 whereas the tertiary amine of Example I was insoluble in water. With CuCl$_2$ a yellow ethanol-soluble coordination compound was formed. The intensely blue color of CoCl$_2$ was bleached almost colorless by formation of a coordination compound. Both the CuCl$_2$ and CoCl$_2$ salt complexes were cationic surfactants. For example, vigorous shaking of these with toluene and water produced stable emulsions.

EXAMPLE XIII

An alkenyl ether suitable for producing a siloxane of this invention can be produced as follows: N,N-dimethylethanolamine (Me$_2$NCH$_2$CH$_2$OH) and a catalytic amount of sodium ethoxide is placed in a pressure vessel and ethylene oxide is injected into the vessel at superatmospheric pressure to produce the adduct:

Me$_2$N(CH$_2$CHO)$_{15}$CH$_2$CH$_2$OH

The latter adduct is reacted with an equal molar amount of sodium ethoxide to produce the salt:

Me$_2$N(CH$_2$CH$_2$O)$_{15}$CH$_2$CH$_2$ONa which is then reacted with an equal molar amount of allyl chloride to produce the alkenyl ether:

Me$_2$N(CH$_2$CH$_2$O)$_{16}$CH$_2$CH=CH$_2$

The latter ether (3.5 moles) is reacted with 1 mole of the siloxane: Me₃SiO(Me₂SiO)₃.₅(MeSiHO)₃.₅SiMe₃ in the presence of 50 parts by weight of platinum per million parts by weight of the reactants. The reaction is conducted by heating a mixture of the reactants and catalyst at 140° C. for 1.5 hours to produce an amine of the invention having the average formula:

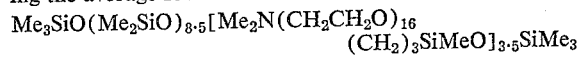

Examples XIV and XV illustrate the production of the amine oxides of this invention.

EXAMPLE XIV

The tertiary amine of this invention produced as described in Example II (30 grams containing 0.097 mole of nitrogen) was heated to 60–65° C. in a 500 milliliter flask that was equipped with a stirrer, dropping funnel, thermometer and condenser. An atmosphere of nitrogen was maintained in the flask. The contents of the flask were maintained at a temperature from 60–65° C. while 16.8 grams of an aqueous hydrogen peroxide solution containing 30 weight percent of hydrogen peroxide (0.15 mole $H_2O_2$) were added dropwise to the flask intermittently over a period of 1.75 hours. The reaction mixture so formed was stirred for an additional 10 minutes after all of the hydrogen peroxide solution had been added to the flask and then the reaction mixture was diluted with 11 grams of ethanol. The product was a clear, pale yellow aqueous ethanol solution which was very soluble in water (the starting teritary amine was not soluble in water). The aqueous ethanol solution contained 60 weight percent amine oxide of this invention having the average formula:

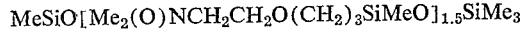

When the aqueous ethanol solution was dissolved in sufficient water to give a concentration of the amine oxide of one weight percent, the resulting solution had surface tension of 20.4 dynes per centimeter at 25° C. When the aqueous ethanol solution was dissolved in sufficient water to give a concentration of the amine oxide of 0.1 weight percent and the solution so formed was applied to polyethylene and cotton, excellent wetting of the polyethylene and cotton was observed.

EXAMPLE XV

The tertiary amine of this invention produced as described in Example I (50 grams containing 0.11 mole of nitrogen) was placed in a flask equipped with a stirrer, dropping funnel, thermometer and condenser. An atmosphere of nitrogen was maintained in the flask. The contents of the flask were heated to 60–65° C. while an aqueous hydrogen peroxide solution (13.3 grams of solution containing 30 weight percent [0.12 mol] $H_2O_2$) was added dropwise over a period of 0.5 hour. After the total amount of aqueous hydrogen peroxide had been added, the reaction mixture so formed was stirred for an additional 0.5 hour and then diluted with 27 grams of ethanol. The aqueous ethanol solution so produced was a clear, pale yellow liquid that was very soluble in water and that contained 60 weight per cent of an amine oxide of this invention having the average formula:

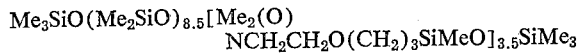

(The starting tertiary amine had been insoluble in water.) When the aqueous ethanol solution was diluted with sufficient water to produce a solution containing one weight per cent of the amine oxide, the surface tension of the resulting solution was 27.0 dynes per centimeter at 25° C.

When the amines of this invention of the silane variety are converted to amine oxides of this invention, it is often desirable to employ anhydrous conditions so as to preserve intact any hydrolyzable groups (e.g. alkoxy groups bonded to silicon) in the silane. In such cases, anhydrous oxidizing agents such as ozone, peracetic acid or perbenzoic acid [dissolved, if desired, in anhydrous solvents (e.g. anhydrous chloroform)] can be employed to convert the amine to the corresponding amine oxide. In preparing the amine oxides of this invention, the product can be separated from any solvents by distillation of the solvents at reduced pressure. As is apparent from Example X, the particular properties imparted to fillers and pigments by the salts of this invention are dependent upon the amount of the salt used. The amount of salt required to impart any given property is readily determined by routine testing.

As used herein, "Me" denotes the methyl groups and "Et" denotes the ethyl group.

Those compounds of this invention, especially the siloxanes, wherein X has a value from 3 to 20 are often particularly useful materials since the properties of such compounds reflect the presence of especially significant amounts of both polyoxalkylene moieties and silicone moieties.

The preference expressed above for N,N-dimethyl amines of this invention as salt-forming compounds had reference only to the formation quaternary salts (e.g. salts formed from the amines and alkyl halides).

What is claimed is:
1. A copolymeric siloxane selected from the group consisting of:
   (A) tertiary aminosiloxanes consisting essentially of
      (I) from 1 to 99 mol percent of siloxane groups represented by the formula:

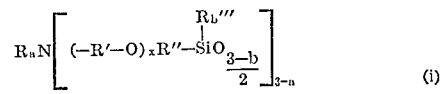

wherein R is a member selected from the group consisting of from 1 to 2 monovalent hydrocarbon groups, from 1 to 2 hydroxy-terminated polyalkyleneoxy groups, from 1 to 2 alkenyloxy-terminated polyalkyleneoxy groups, from 1 to 2 hydroxyalkyl groups, from 1 to 2 tertiary aminoalkyl groups, and a divalent group which, together with the nitrogen atom in the formula, forms a heterocyclic ring; $a$ has a value from 0 to 2 inclusive and represents the valence of R; $x$ has a value of at least one; R' is an alkylene group; R" is an alkylene group containing at least two successive carbon atoms; one of which is attached to the silicon atom of the formula and the other of which is attached to the adjacent ether oxygen atom in the formula; R''' is a monovalent hydrocarbon group free of aliphatic unsaturation; and $b$ has a value of from 0 to 2 inclusive; and (II) from 1 to 99 mol percent of at least one siloxane group selected from the group consisting of the siloxane groups represented by the formulae;

wherein G is a member selected from the group consisting of the hydrogen atom and the monovalent hydrocarbon groups and $c$ has a value from 0 to 3 inclusive;

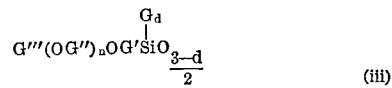

wherein G has the above-defined meaning, G' is an alklene group containing at least two successive carbon atoms, G" is an alkylene radical containing at least two carbon atoms, G''' is a member selected from the group consisting of the hydrogen atom and the monovalent hydrocarbon groups, $n$ has a value of at least 1 and $d$ has a value from 0 to 2 inclusive;

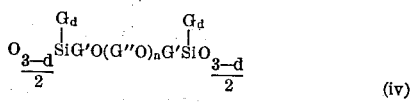
(iv)

wherein the various symbols have the meanings defined above;

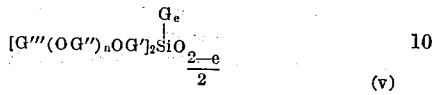
(v)

wherein $e$ has a value from 0 to 1 inclusive and the remaining symbols have the meanings defined above;

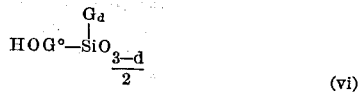
(vi)

wherein $G°$ is a divalent hydrocarbon group and $G$ and $d$ have the above-defined meanings and

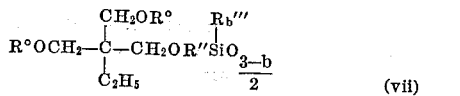
(vii)

wherein $R°$ is a member selected from the group consisting of the hydrogen atom and the acyl groups and the remaining symbols have the meanings defined above;

(B) amine oxide derivatives of the tertiary aminosiloxanes of A above, said amine oxide derivatives consisting essentially of (I) from 1 to 99 mol percent of siloxane groups represented by the formula:

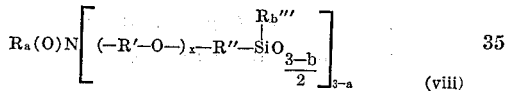
(viii)

wherein the various symbols have the meanings defined above; and (II) from 1 to 99 mol percent of at least one siloxane group selected from the group consisting of the siloxane groups represented by Formulas ii to vii above inclusive;

(C) quaternary ammonium salt derivatives of the aminosiloxanes of A above, said quaternary ammonium salt derivatives consisting essentially of (I) from 1 to 99 mol percent of siloxane groups represented by the formula:

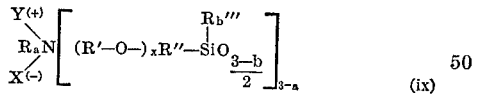
(ix)

wherein X is a member selected from the group consisting of the halogen atoms, the acyloxy groups and monovalent groups represented by the formula $YSO_4$ and Y is a member selected from the group consisting of the monovalent hydrocarbon group, the halogen atom and groups having the formula

where $z$ has a value from 1 to 20 inclusive, and the remaining symbols are as above defined; and (II) from 1 to 99 mol percent of at least one siloxane group selected from the group consisting of the siloxane groups represented by Formulas ii to vii above inclusive; and (D) metal coordination compound derivatives of the tertiary aminosiloxanes of A above, said metal coordination compound derivatives being produced by reacting said tertiary aminosiloxanes and a transition metal compound selected from the group, consisting of transition metal halides, hydroxides, nitrates, salts of carboxylic acids, sulfates and phosphates.

2. An amine oxide as defined in part B of claim 1.

3. A copolymeric siloxane as defined in claim 1 wherein $x$ has a value from 3 to 20.

4. Tertiary aminosiloxanes consisting essentially of (I) from 10 to 90 mol percent of siloxane groups as defined in part A of claim 1 and (II) from 10 to 90 mol percent of at least one siloxane group selected from the group consisting of the siloxane groups represented by the formulae:

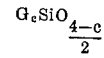

wherein G is a member selected from the group consisting of the hydrogen atom and the monovalent hydrocarbon groups and $c$ has a value from 0 to 3 inclusive;

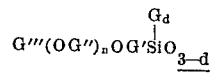

wherein G has the above-defined meaning, G' is an alkylene group containing at least two successive carbon atoms, G'' is an alkylene radical containing at least two carbon atoms, G''' is a member selected from the group consisting of the hydrogen atom and the monovalent hydrocarbon groups, $n$ has a value of at least $l$ and $d$ has a value from 0 to 2 inclusive;

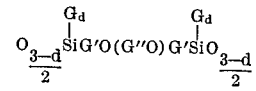

wherein the various symbols have the meanings defined above;

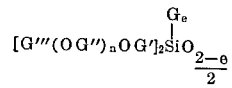

wherein $e$ has a value from 0 to 1 inclusive and the remaining symbols have the meanings defined; above;

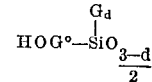

wherein $G°$ is a divalent hydrocarbon group and G and $d$ have the above-defined meanings and

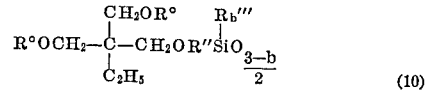
(10)

wherein $R°$ is a member selected from the group consisting of the hydrogen atom and the acyl groups and the remaining symbols have the meanings defined above.

5. Quaternary ammonium salts consisting essentially of (I) from 10 to 90 mol percent of siloxane groups represented by the formula:

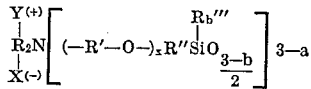

wherein R is a member selected from the group consisting of from 1 to 2 monovalent hydrocarbon groups, from 1 to 2 hydroxy-terminated polyalkyleneoxy groups, from 1 to 2 alkenyloxy-terminated polyalkyleneoxy groups, from 1 to 2 hydroxyalkyl groups, from 1 to 2 tertiary aminoalkyl groups; and a divalent group which, to gether with the nitrogen atom in the formula, forms a heterocyclic ring; $a$ has a value from 0 to 2 inclusive and represents the valence of R; $x$ has a value of at least one; R' is an alkylene group; R'' is an alkylene group containing at least two successive carbon atoms, one of which is attached to the adjacent ether oxygen atom in the formula; R''' is a monovalent hydrocarbon group free of aliphatic unsaturation; X is a member selected from the group consisting of the halogen atoms, the acyloxy groups, the monovalent groups represented by the formula $YSO_4$ and Y is a member selected from the group consisting of the monovalent hydrocarbon groups, the hydrogen atom and the groups having the formula $—C_zH_{2z}COOR'''$ wherein z has a value from 1 to 20 inclusive and R''' has the above-defined meaning and (II) from 10 to 90 mol percent of at least one siloxane group selected from the groups consisting of the siloxane groups as defined in part A (II) of claim 1.

6. A metal coordination compound produced by reacting a tertiary amine selected from the group consisting of a tertiary amine as defined in claim 1 and a transition metal compound selected from the group consisting of transition metal halides, hydroxides, nitrates, salts of carboxylic acids, sulfates and phosphates.

7. A siloxane having the average formula:

$Me_3SiO(Me_2SiO)_r[Me_2NCH_2CH_2O(CH_2)_sSiMeO]_tSiMe_3$ wherein r has a value from 0 to 24 inclusive, s has a valve from 2 to 3 inclusive and t has a value from 1 to 5 inclusive.

8. A siloxane having the average formula;

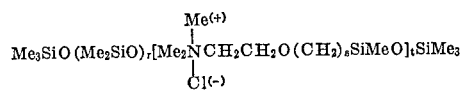

wherein r has a value from 0 to 24 inclusive, s has a valve from 2 to 3 inclusive and t has a value from 1 to 5 inclusive.

9. A siloxane having the average formula:

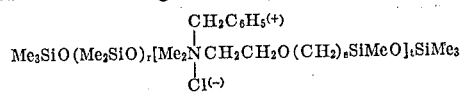

wherein r has a value from 0 to 24 inclusive, s has a valve from 2 to 3 inclusive and t has a value from 1 to 5 inclusive.

10. A tertiary aminosiloxane as defined in claim 6 wherein the siloxane groups defined in part (II) of claim 6 are only those groups represented by said formula:

$$G_cSiO_{\frac{4-c}{2}}$$

wherein G is a monovalent hydrocarbon group and c has a value of 0 to 3 inclusive.

11. A tertiary aminosiloxane as defined in claim 10 wherein x has a value from 3 to 20.

12. A tertiary aminosiloxane as defined in claim 6 wherein a is 2 and each R is a hydroxy-terminated polyalkyleneoxy group.

13. A tertiary aminosiloxane as defined in claim 6 wherein a is 2 and each R is an alkenyloxy-terminated polyalkyleneoxy group.

References Cited

UNITED STATES PATENTS

| | | | |
|---|---|---|---|
| 3,341,563 | 9/1967 | Buchheit et al. | 260—448.8 |
| 2,955,127 | 10/1960 | Pike | 260—448.2 |
| 2,972,598 | 2/1961 | Morehouse | 260—448.2 |
| 3,046,250 | 7/1962 | Plueddemann | 260—448.2 |
| 3,234,252 | 2/1966 | Pater | 260—448.2 |

TOBIAS E. LEVOW, *Primary Examiner.*

P. F. SHAVER, *Assistant Examiner.*